United States Patent
Krishnamoorthy et al.

(10) Patent No.: US 12,334,586 B2
(45) Date of Patent: Jun. 17, 2025

(54) COMPOSITE LAYERS OR SEPARATORS FOR LEAD ACID BATTERIES

(71) Applicant: Daramic, LLC, Charlotte, NC (US)

(72) Inventors: Ahila Krishnamoorthy, Bangalore (IN); Kumar Manickam, Bangalore (IN); Robert Saffel, Rockport, IN (US)

(73) Assignee: DARAMIC, LLC, Charlotte, NC (US)

(*) Notice: Subject to any disclaimer, the term of this patent is extended or adjusted under 35 U.S.C. 154(b) by 0 days.

(21) Appl. No.: 18/197,537

(22) Filed: May 15, 2023

(65) Prior Publication Data
US 2023/0344079 A1 Oct. 26, 2023

Related U.S. Application Data

(62) Division of application No. 17/498,778, filed on Oct. 12, 2021, now Pat. No. 11,652,260, which is a
(Continued)

(30) Foreign Application Priority Data
Mar. 18, 2017 (IN) .............................. 201731009500

(51) Int. Cl.
*H01M 50/44* (2021.01)
*H01M 4/14* (2006.01)
(Continued)

(52) U.S. Cl.
CPC .............. *H01M 50/44* (2021.01); *H01M 4/14* (2013.01); *H01M 50/403* (2021.01);
(Continued)

(58) Field of Classification Search
CPC .. H01M 50/44; H01M 50/403; H01M 50/449; H01M 50/431; H01M 50/446
(Continued)

(56) References Cited

U.S. PATENT DOCUMENTS 5,091,275 A 2/1992 Brecht et al.
5,989,750 A 11/1999 Ohba et al.
(Continued)

FOREIGN PATENT DOCUMENTS

JP 2000299098 A * 10/2000

OTHER PUBLICATIONS

McGregor et al. Essential characteristics for separators in valve-regulated lead-acid batteries, Journal of Power Sources 111, 2002, pp. 288-303 [online]. Retrieved from <URL: https://www.researchgate.net/publication/222936179> (Year: 2002).*

*Primary Examiner* — James M Erwin
(74) *Attorney, Agent, or Firm* — J. Clinton Wimbish; Maynard Nexsen PC

(57) ABSTRACT

Disclosed herein are novel or improved fibrous layers, composites, composite separators, separators, composite mat separators, composite mat separators containing fibers and silica particles, battery separators, lead acid battery separators, and/or flooded lead acid battery separators, and/or batteries, cells, and/or methods of manufacture and/or use of such fibrous layers, composites, composite separators, separators, battery separators, lead acid battery separators, cells, and/or batteries. In addition, disclosed herein are methods, systems, and battery separators for enhancing battery life, reducing internal resistance, reducing metalloid poisoning, reducing acid stratification, and/or improving uniformity in at least enhanced flooded batteries.

20 Claims, 6 Drawing Sheets

Related U.S. Application Data division of application No. 15/922,052, filed on Mar. 15, 2018, now Pat. No. 11,145,934.

(51) Int. Cl.
*H01M 50/403* (2021.01)
*H01M 50/429* (2021.01)
*H01M 50/437* (2021.01)
*H01M 50/446* (2021.01)
*H01M 50/449* (2021.01)
*H01M 50/454* (2021.01)
*H01M 50/489* (2021.01)
*H01M 4/02* (2006.01)
*H01M 10/12* (2006.01)

(52) U.S. Cl.
CPC ..... *H01M 50/4295* (2021.01); *H01M 50/437* (2021.01); *H01M 50/446* (2021.01); *H01M 50/449* (2021.01); *H01M 50/454* (2021.01); *H01M 50/489* (2021.01); *H01M 2004/027* (2013.01); *H01M 2004/028* (2013.01); *H01M 10/12* (2013.01)

(58) Field of Classification Search
USPC .......................................................... 429/129
See application file for complete search history.

(56) References Cited

U.S. PATENT DOCUMENTS

| | | |
|---|---|---|
| 2009/0148760 A1 | 6/2009 | Justice |
| 2015/0171398 A1 | 6/2015 | Roumi |
| 2015/0318529 A1* | 11/2015 | Whear ................ H01M 50/431 429/246 |
| 2017/0077479 A1 | 3/2017 | Miller et al. |
| 2017/0179454 A1* | 6/2017 | Natesh ................ H01M 50/44 |

* cited by examiner

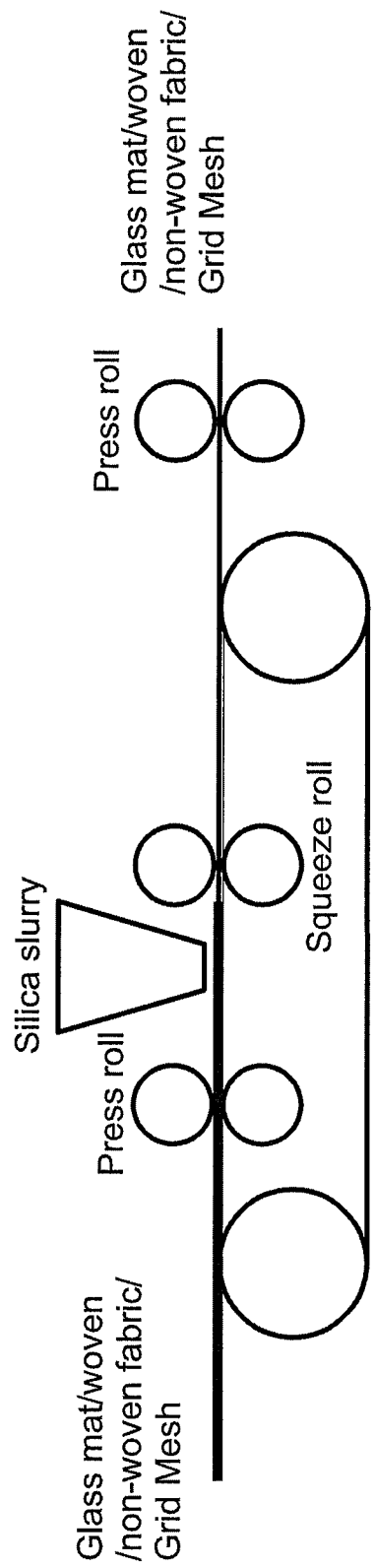

COMPOSITE LAYERS OR SEPARATORS FOR LEAD ACID BATTERIES

CROSS-REFERENCE TO RELATED APPLICATIONS

This application is a Divisional Application to U.S. application Ser. No. 17/498,778, filed Oct. 12, 2021, which claims priority to U.S. application Ser. No. 15/922,052, filed Mar. 15, 2018, and Issued as U.S. Pat. No. 11,145,934 on Oct. 12, 2021, which claims priority to and the benefit of Indian Application No. 201731009500 filed Mar. 18, 2017.

FIELD

In accordance with at least selected embodiments, the present disclosure or invention is directed to novel or improved mats, fibrous layers, separators, composite separators, composite mat separators, composite mat separators containing fibers and silica particles, battery separators, lead acid battery separators, batteries, cells, and/or methods of manufacture and/or use of such mats, separators, battery separators, lead acid battery separators, batteries, and/or cells, as well as vehicles, systems, or devices containing the same. In accordance with at least certain embodiments, the present disclosure or invention is directed to novel or improved enhanced composite separators for lead acid batteries, and/or improved methods of making and/or using such improved separators, cells, batteries, systems, vehicles, and/or the like. In accordance with at least certain embodiments, the present disclosure or invention is directed to an improved composite separator for lead acid batteries and/or improved methods of using such batteries having such improved separators. In accordance with at least selected embodiments, the present disclosure or invention is directed to composite separators, particularly separators for lead acid batteries, flooded batteries, enhanced flooded batteries, dry charge batteries, and/or the like. In addition, disclosed herein are methods, systems and battery separators for enhancing battery life, decreasing shorting, reducing water loss, increasing wettability, reducing acid stratification, improving acid diffusion, reducing active material shedding, reducing metal induced oxidation, reducing oxidation, reducing heavy metal and/or metalloid poisoning, reducing antimony poisoning, increasing antimony suppression, and/or improving uniformity in one or more lead acid batteries. In accordance with at least particular embodiments, the present disclosure or invention is directed to an improved separator for lead acid batteries wherein the separator includes fibers, one or more binders, silica particles, fillers, additives, surfactants, coatings and/or the like.

BACKGROUND

Lead acid batteries can include one or more battery separators which divide, or "separate," the positive electrode from the negative electrode within a lead acid battery cell. A battery separator may have at least two primary functions. First, a battery separator should be electrically insulating and should keep the positive electrode physically apart from the negative electrode in order to prevent any electronic current passing between the two electrodes. Second, a battery separator should permit an ionic current between the positive and negative electrodes with the least possible resistance. A battery separator can be made out of many different materials, but these two opposing functions have been met well by a battery separator being made of a porous nonconductor.

There are many different pathways by which a lead acid battery can fail or lose power or lifespan. If the active material is flaked or otherwise sheds from the positive electrode and comes into contact with the negative electrode, battery performance is reduced. Such a process can be designated positive active material (PAM) shedding. Acid stratification is a term for the process in which denser concentrated sulfuric acid is accumulated at the bottom of the battery, leading to a corresponding higher amount of water (dilute acid) at the top of the battery. The reduced levels of acid at the top inhibit plate activation and can induce sulfation. Increased acid levels at the bottom artificially raise the voltage of the battery, which can interfere with battery management systems. Overall, acid stratification causes higher resistance which leads to shorter battery life and lower battery performance.

Grids of positive electrodes in deep cycle flooded batteries are made of lead antimony alloys to enable deep cycling performance. However, during deep cycling, antimony from grid alloy dissolves into the electrolyte and reaches the negative electrode and deposits on it, dropping overvoltage for hydrogen evolution resulting in enhanced water hydrolysis, water loss and poisoning of the negative electrode. This is termed antimony poisoning. Due to this phenomenon, these types of flooded deep cycle batteries require maintenance through the periodic addition of water to make up for loss of water.

Glass mats or wet laid nonwovens have been explored to address some of the challenges mentioned above. These mats or nonwovens could be made of synthetic wood pulp and glass fibers, or synthetic fibers held together by synthetic or natural (such as natural rubber latex) polymeric binders. Although such materials may exhibit increased oxidation resistance and/or reduced active material shedding, they do not completely solve the problems of antimony poisoning and acid stratification.

There is a need for new battery separators and/or new battery technology to meet and overcome the challenges arising from current lead acid battery needs, especially to reduce antimony poisoning, increase antimony suppression, reduce oxidation, reduce water loss, reduce shorting, and/or reduce acid stratification.

SUMMARY

In accordance with at least selected embodiments, the present disclosure or invention may address the above issues or needs, and/or may provide novel or improved mats, fibrous layers, separators, fibrous separators, composite separators, composite mat separators, composite mat separators containing fibers and silica particles, battery separators, lead acid battery separators, batteries, cells, and/or methods of manufacture and/or use of such mats, separators, battery separators, lead acid battery separators, batteries, and/or cells, as well as vehicles, systems, or devices containing the same. In accordance with at least certain embodiments, the present disclosure or invention is directed to novel or improved enhanced composite separators for lead acid batteries, and/or improved methods of making and/or using such improved separators, cells, batteries, systems, vehicles, and/or the like. In accordance with at least certain embodiments, the present disclosure or invention is directed to an improved composite separator for lead acid batteries and/or improved methods of using such batteries having such improved separators. In accordance with at least selected embodiments, the present disclosure or invention is directed to composite separators, particularly separators for lead acid batteries, flooded batteries, enhanced flooded batteries, dry charge batteries, and/or the like. In addition, disclosed herein are methods, systems and battery separators for enhancing battery life, decreasing shorting, reducing water loss, increasing wettability, reducing acid stratification, improving acid diffusion, reducing active material shedding, reducing metal induced oxidation, reducing oxidation, reducing heavy metal and/or metalloid poisoning, reducing antimony poisoning, increasing antimony suppression, and/or improving uniformity in one or more lead acid batteries. In accordance with at least particular embodiments, the present disclosure or invention is directed to an improved separator for lead acid batteries wherein the separator includes fibers, one or more binders, silica particles, fillers, additives, surfactants, coatings and/or the like.

In accordance with at least certain objects, aspects or embodiments, the present disclosure or invention may provide an improved composite separator which overcomes the aforementioned problems, for instance by providing improved oxidation resistance, improved wicking, improved wettability, improved acid retention, improvements in acid displacement, improved puncture strength, improvements in electrical resistance (ER), reduced acid stratification, increased acid diffusion, reduced electrode shedding (for example, reduced PAM shedding) and/or reduced antimony poisoning. The battery separators described herein may be key for improving performance for various lead acid batteries, including, but not limited to, deep cycling batteries (e.g., where antimony suppression is a need), batteries operating in a partial state of charge, dry charge batteries (e.g., where oxidation resistance is a need), stationary batteries, inverter batteries and/or uninterrupted power supply (UPS) batteries (e.g., where reduced acid stratification and/or improved acid mixing is a need), batteries used in solar power, batteries used in wind power, certain batteries in motion, such as truck batteries or batteries that undergo high vibration or automobile batteries (e.g., where improved ER is a need), enhanced flooded batteries that operate in partial state of charge, and so forth. The battery separators described herein may be in a leaf format, cut piece format, sleeve format, pocket format, envelope format, and the like.

In accordance with at least selected embodiments, the present disclosure or invention may address the above issues or needs and/or may provide novel or improved lead acid battery separators and/or lead acid batteries. In accordance with at least selected embodiments, the present disclosure or invention is directed to novel or improved separators, battery separators, lead acid battery separators, batteries, cells, and/or methods of manufacture and/or use of such separators, battery separators, lead acid battery separators, batteries, and/or cells. In accordance with at least certain embodiments, the present disclosure or invention is directed to novel or improved lead acid battery separators for idle start stop (ISS) applications, in enhanced flooded batteries, in a flooded battery, an enhanced flooded battery, an ISS battery, a dry charge battery, an AGM battery, a VRLA battery, a VRLA-AGM battery, a gel battery, a tubular battery, a flat plate battery, or the like, and/or improved methods of making and/or using such improved separators, cells, batteries, systems, and/or the like. In accordance with at least certain embodiments, the present disclosure or invention is directed to an improved separator for lead acid batteries, the improved lead acid batteries, and/or improved methods of using such batteries having such improved separators. In addition, disclosed herein are vehicles, methods, systems, batteries, cells, and battery separators for enhancing battery life, reducing acid stratification, reducing antimony poisoning, reducing active material shedding (such as PAM shedding), reducing oxidation, increasing performance, and/or improving uniformity in at least lead acid batteries. In accordance with at least particular embodiments, the present disclosure or invention is directed to an improved separator for lead acid batteries wherein the separator includes fibrous materials, silica particles and/or a binder.

In accordance with at least certain embodiments, the present disclosure or invention may address the above issues or needs and/or may provide novel or improved mats, separators, composite separators, battery separators, lead acid battery separators, flooded lead acid battery separators and/or battery technology that addresses, meets and/or overcomes the challenges arising from current lead acid battery needs, especially that reduce antimony poisoning, increase antimony suppression, reduce oxidation (increase oxidation resistance), reduce water loss, reduce shorting, reduce lead requirements, and/or reduce acid stratification, and/or that increase cycle life, increase the warranty period, and/or the like.

In accordance with at least certain selected embodiments, the composite separator may include fibrous materials. Suitable materials include synthetic and natural fibers, including glass fibers, polymeric fibers, polyesters (such as polyethylene terephthalate fibers (PET fibers)), polyolefins, polyamides, polyimides, polyacrylonitriles, poly(meth)acrylates, cellulose, nylon, and combinations thereof. In some particular embodiments, the composite separator may include bunches or bundles of fibers, for example, bunches of glass fibers and/or bunches of synthetic fibers, such as certain polymeric fibers. In addition, in certain embodiments, the composite separator may include twisted bunches or bundles of fibers, for example, twisted bunches of glass fibers and/or twisted bunches of synthetic fibers, such as certain polymeric fibers or combinations thereof. In such embodiments, it is preferred that in order to retain the bunch format, such bunches of fibers are bound together with a binder that does not dissolve in water and/or aqueous solutions, etc. In such embodiments, that binder may be applied in various ways, such as sprayed, when the fibers are drawn through a forming orifice. In such instances, such a binder may cure quickly and/or instantly due to the high temperature at which fiber exits a forming orifice (for example, in a molten phase) and yet the quick cooling to a solid phase that the fiber undergoes. Binder is sprayed not when glass fiber bunch exits the orifice as it will be at very high temperature. In such embodiments involving twisted bunches of fibers, twisting may occur as a result of a rotating or twisting orifice from which fibers being formed exit. As described just above, such twists may be held in place with the use of various binder(s). In various embodiments, any combination of twisted yarn and/or twisted bunches or bundles of fibers, and/or twisted individual fibers, and/or bunches of fibers, and/or individual fibers may be used in accordance with the processes and battery separators described herein. However, the region to spray binder is carefully chosen to not decompose binder, but to just cure it quickly, where curing is desired, to hold the fiber bunch together. By holding the fibers or fiber bunches together by binder, stiffness of fibers increase enormously. Twisted fibers or bunches of fibers imparts orders of magnitude higher strength than individual strands of fiber, and such strength implies or is related to stiffness. Various combinations may provide enhanced stiffness, durability, and/or enhanced prevention of PAM shedding. By way of example, a combination of silica, glass fibers, synthetic untwisted fibers, and synthetic twisted fibers may produce a composite mat for use as a battery separator that has enhanced stiffness and/or enhanced prevention of PAM shedding. In various embodiments contemplated herein, about 2% to about 50% of the fibers used in a composite mat may be twisted. In other embodiments, a composite mat may include about 30% total fibrous material or 30% by weight of the total, fibers; twisted fibers can make up 0% to all of the 30% total fibrous content, while untwisted fibers can make up 0% to all of the 30% total fibrous content. Together with twisted glass fibers, twisted synthetic fibers can be added to form the final composite mat.

Generally, it is preferred that the fibrous materials used in the battery separators described herein are not oxidizable, or not substantially oxidized or degraded under conditions found in the context of a lead acid battery, especially at the positive plate or cathode. The fibrous materials in the separator can be non-woven, woven, knitted, braided, felt, film, net, and/or mesh. In certain embodiments, the composite separator comprises a fibrous layer comprising a fibrous material that comprises a combination of microglass fiber, polyester staple fiber, and chopped strand glass fiber. The basis weight of the separator, or of the fibrous layer comprising the fibrous material, may be about 10 g/m² to about 200 g/m², including all ranges in between.

In accordance with at least certain selected embodiments, the composite separator or fibrous layer may include silica, for instance silica particles or flocculated silica particles or flakes. The particles may be of various sizes, shapes, and formats, and may be dispersed throughout the composite separator or may be coated, overlaid, impregnated or otherwise disposed on one or both surfaces of the composite separator. The silica may provide wettability, small pore size, and/or wicking properties to various layers of the battery separators described herein.

In accordance with at least certain selected embodiments, the composite separator or fibrous layer may include a binder, for instance a polymeric binder or binders. The binder may be dispersed throughout the composite separator or may be coated, overlaid, impregnated, or otherwise disposed on one or both surfaces of the composite separator or fibrous layer.

In accordance with at least certain selected embodiments, a battery including a microporous separator, which battery exhibits reduced electrode shedding (for example, PAM shedding), is provided. Since the separator or fibrous layer may be in direct contact with the electrode, it immobilizes any electrode material from dispersing into the battery. The electrode material may also embed itself onto the surface of the separator or fibrous layer during formation process resulting in immobilizing PAM and preventing shedding.

In accordance with at least certain selected embodiments, a microporous separator with decreased antimony and other metal poisoning is provided. Because the separator or fibrous layer has a large area of highly polar surfaces, for example, high surface area particles, such as silica particles, in the separator, metals and metalloids are captured or occluded or sequestered within the separator.

The separator or fibrous layer may contain one or more performance enhancing additives, such as a surfactant, along with other inorganic and/or organic additives or agents, residual oil, deflocculants, dispersants, coagulants, and/or fillers. Dispersing agents may include, by way of example, polyethylene glycol (PEG). Such performance enhancing additives can further reduce separator oxidation, reduce water loss, and/or facilitate the transport of ions across the separator.

In certain selected embodiments, the composite separator is provided with additional layers or materials. The layers or materials may comprise latex, polyolefin, phenol-formaldehyde (PF) based resins, crosslinked latex, crosslinked polyolefin, thermoset resin, thermoset binder, epoxy resin, thermoset polymeric film or combinations thereof.

In certain selected embodiments, the separator is provided with ribs on one or both sides. The ribs may be formed directly in the composite material, or may be added to a material making up a separate layer, for instance, an added layer of thermoplastic polymer such as polyethylene or an added layer of thermoset polymer such as resol or PF resin or polyester. The ribs may be made on a polymeric film, which film is later on bonded to the fiber/particle web to form a two layer composite separator. In certain embodiments, the present disclosure includes a composite battery separator that includes a laminate comprising a membrane separator layer, such as a polymer separator layer, such as a microporous polyethylene membrane separator layer, and a mat or fibrous layer in accordance with any of the various embodiments set forth herein.

BRIEF DESCRIPTIONS OF THE FIGURES

FIG. 3A depicts a nonwoven glass mat or fabric used in various methods of making a composite separator or a layer of a composite separator; FIG. 3B depicts various methods of making a composite separator or a layer of a composite separator according to the disclosure herein.

Figure 4:
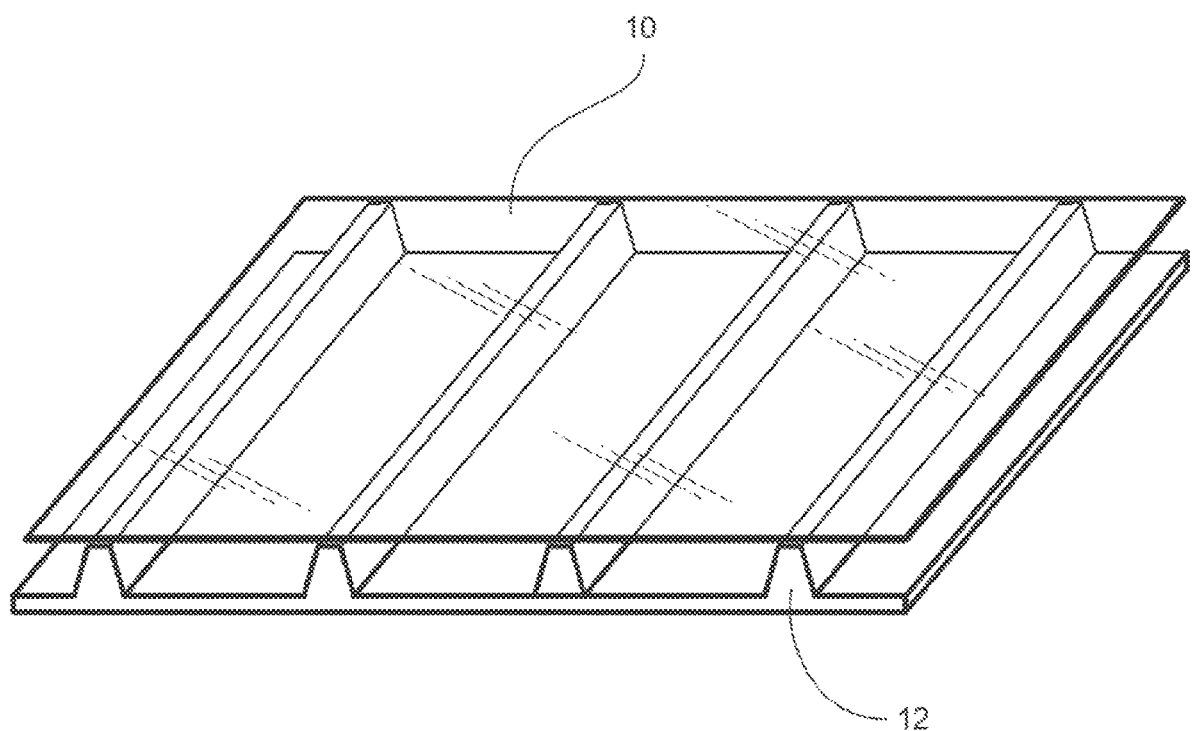

FIG. 4 depicts an embodiment of the present invention in which a nonwoven separator layer 10 is juxtaposed adjacent to a ribbed separator layer 12, for example, a ribbed microporous polymeric membrane separator layer 12.

Figure 5:
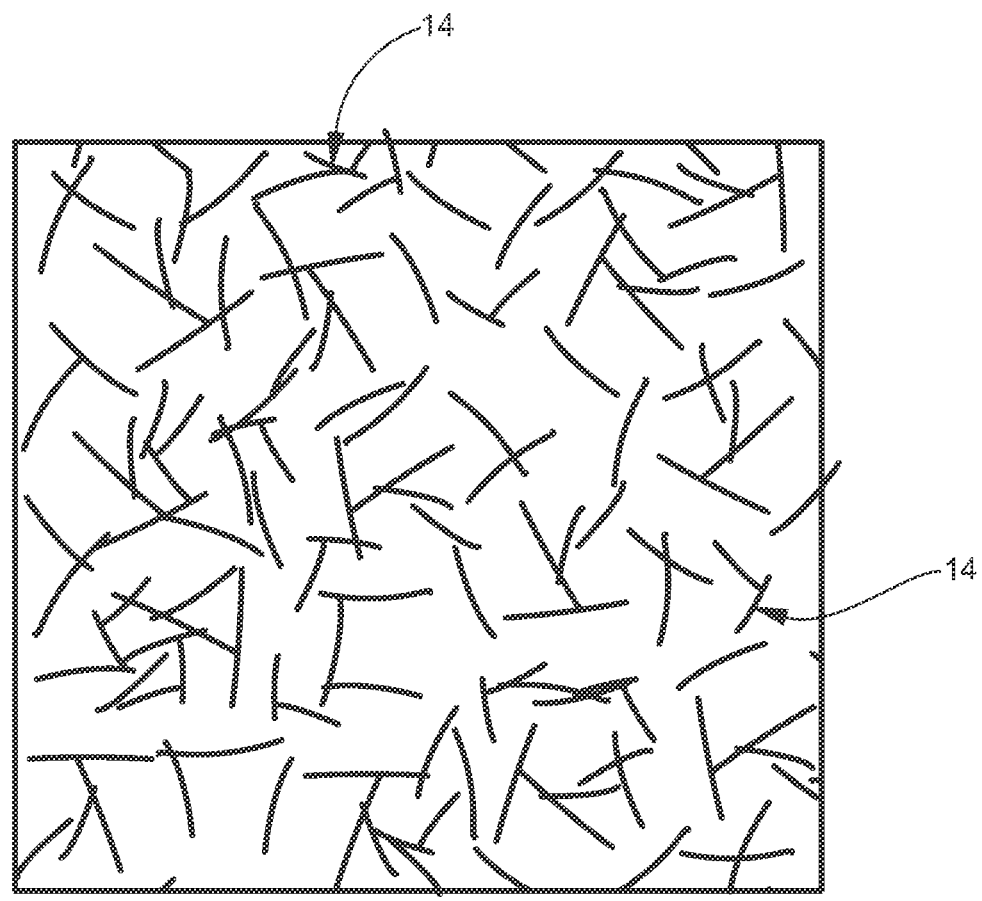

FIG. 5 depicts a composite mat and/or a nonwoven separator layer according to various embodiments of the present invention in which fibers and/or fibrous material 14 is shown.

Figure 6A:
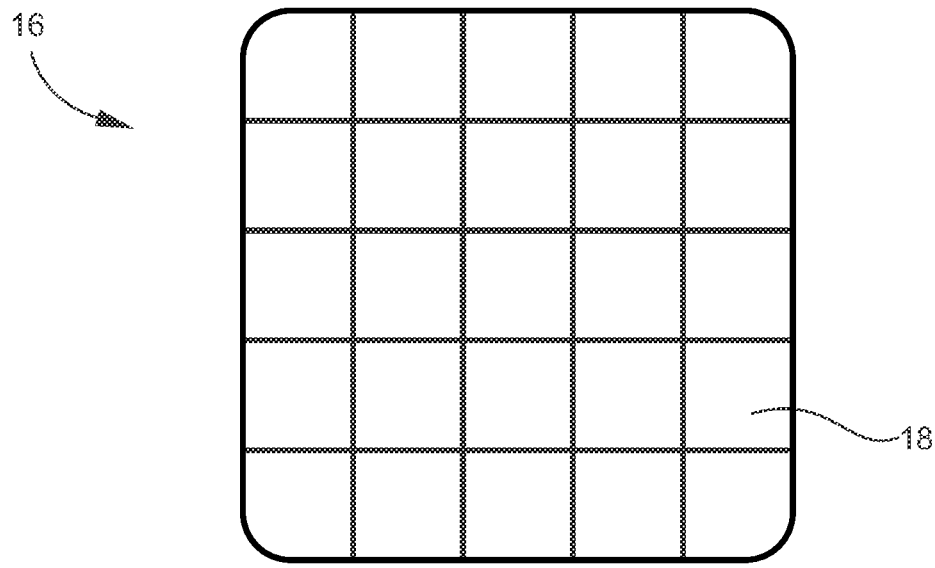
Figure 6B:
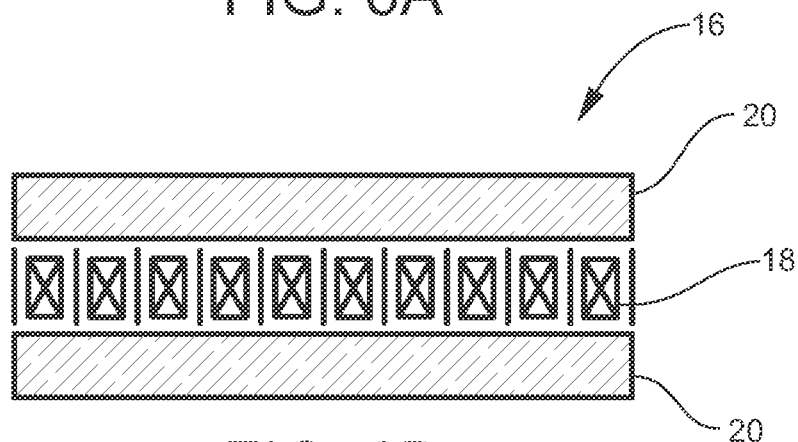
Figure 6C:
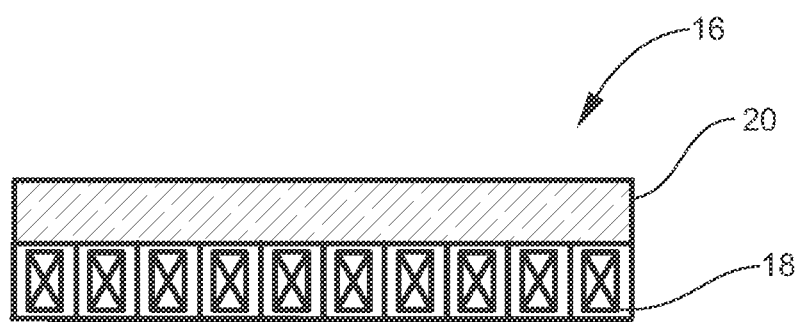

FIGS. 6A, 6B, and 6C depict another embodiment of a composite mat or a separator layer formed in accordance with the present disclosure. FIG. 6A depicts a surface view of a grid or mesh 16 with open areas or openings 18. FIG. 6B depicts a cross-section of the same grid or mesh of FIG. 6A after it has been impregnated with a mixture of binder and filler, for example, silica filler. In FIG. 6B, the mixture of binder and filler (for example, silica filler) fills the openings 18. The mixture also creates a layer 20, such as a silica layer 20, on each side of the grid or mesh 16. In certain embodiments, the binder and filler mixture is squeezed through the grid or mesh 16 to create layer 20 on each side of the grid or mesh 16. In FIG. 6C, an alternative embodiment, the mixture of binder and filler (for example, silica) simply seals the openings 18 and creates a layer of binder and silica (or a silica layer) 20 on only one side of the grid or mesh 16, leaving the grid or mesh 16 visible from one side. In another alternative embodiment (not shown), the mixture of binder and filler (for example, silica filler) simply impregnates the grid or mesh 16 simply sealing the openings 18 and not creating any layer of binder and silica on either side of the grid or mesh 16, leaving both sides of the grid or mesh 16 visible.

DETAILED DESCRIPTION

In accordance with at least certain embodiments, the disclosed or inventive layer, material, or separator is preferably a porous composite separator (such as a microporous composite separator) containing natural or synthetic fibers, such as glass fibers, ceramic fibers (alumina, silica, zirconia, aluminum silicate, or the like), cellulosic fibers, polyolefin, polyester, polyvinyl, polyamide, viscose, acrylic, non-conductive carbon fibers or combinations thereof, more preferably glass fibers (such as microglass fibers, fine fibers of low diameter, possibly used in various combinations of grades/diameters, and/or chopped strand fibers, possibly of slightly higher diameter to give enhanced stiffness and mechanical strength). Fine glass fibers may provide resiliency and/or structural integrity to the battery separators described herein. Synthetic and/or polymeric fibers may provide flexibility and/or self-welding capability to fibrous layers of the battery separators described herein. When PAM shedding is the major failure mechanism in batteries such as in high vibration conditions, a composite mat or fibrous layer containing stiff fibers such as bonded twisted glass fibers or twisted synthetic fibers can be added to form the composite or separator. The composite separator further contains silica particles and may optionally contain a polymeric binder. In some selected embodiments the composite separator may be prepared by combining fibers, silica particles (which may be flocculated) and a polymeric binder, forming a mat by a process, such as a nonwoven process, or a woven process, or a wet-laid process or a dry-laid process (after ingredients are dry blended), and then curing the composite at elevated temperature (by way of example only, using heat, using IR, etc.) to bond the fibers and particles together. In other selected embodiments, a pre-made fiber mat is overlaid, coated, impregnated or otherwise contacted with a mixture of silica particles and polymeric binder. In these embodiments, the fiber mat can be non-woven or woven, braided, knitted, felt, film or mesh.

In certain selected embodiments, the fibers can be glass, cellulose, polyethylene, polypropylene, polyethylene terephthalate (PET), polyvinyl chloride, and mixtures thereof. Exemplary mixtures include, but are not limited to, mixtures of glass fibers with one or more synthetic fibers, for instance, glass and polyethylene, or glass and PET. The weight ratio of the glass:synthetic fiber can be from 100:1 to 1:100, 50:1, to 1:50, 25:1 to 1:25, 10:1 to 1:10, 5:1 to 1:5, 10:1 to 1:1, 5:1 to 1:1.

In certain selected embodiments, the fibers can be less than about 20, or 15, or even 10, 9, 8, 7, 6, 5, 4, 3, 2, 1 or 0.5 μm in diameter. The glass fibers can be at least 0.25, 0.50, 0.75, 1.0, 1.25, 1.50, 1.75, 2.0, 2.25, 2.5, 2.75 or 3.0 cm in length. In certain embodiments, the polymeric fibers can be longer than the glass fibers. For example, polymeric fibers may range in length from about 0.25 mm to about 6 cm in length, in certain embodiments, from about 3 mm to about 25 mm in certain embodiments. Such fibers may be un-crimped; in other embodiments, such fibers may be crimped. Such fibers may be short-cut or long-cut. The denier of such fibers, for example, polymeric fibers, may be about 0.4 denier to about 3.0 denier. In certain embodiments, by way of example only, PET fibers having a denier of about 0.5 are used to make a nonwoven separator layer according to the present disclosure. In other embodiments, all sorts of fibers at various fiber lengths and denier may be successfully used to create the separators and/or the separator layers described herein, and such fibers may include, but are not limited to, those depicted just below in tabular form:

TABLE 1

| Generic Type Polyester: Density 1.38 g/cm³ Diameter | | |
|---|---|---|
| Denier | Microns (μm) | Decitex |
| 0.5 | 7.16 | 0.55 |
| 3.0 | 17.53 | 3.3 |
| 6.0 | 24.79 | 6.6 |
| 12.0 | 35.06 | 13.2 |
| 25.0 | 50.60 | 27.5 |

TABLE 2

| Diameter (μm) v. Count (dtex) | | | | | | |
|---|---|---|---|---|---|---|
| Material | PP | PA6 PA66 | PA11 PA12 | PET PPS PVC | PEEK | PVDE ETFE E-CTFE | FEP PTFE |
| Density (g/cm3) | 0.91 | 1.14 | 1.03 | 1.38 | 1.32 | 1.75 | 2.1 |
| Diameter (μm) | (dtex) | (dtex) | (dtex) | (dtex) | (dtex) | (dtex) | (dtex) |
| 10 | 0.72 | 0.90 | 0.81 | 1.08 | 1.04 | 1.38 | 1.65 |
| 20 | 2.86 | 3.58 | 3.24 | 4.34 | 4.15 | 5.50 | 6.60 |
| 30 | 6.40 | 8.10 | 7.30 | 9.80 | 9.30 | 12.40 | 14.90 |
| 32 | 7.30 | 9.20 | 8.30 | 11.10 | 10.60 | 14.10 | 16.90 |
| 34 | 8.30 | 10.40 | 9.40 | 12.50 | 12.00 | 15.90 | 19.10 |
| 36 | 9.30 | 11.60 | 10.50 | 14.10 | 13.40 | 17.80 | 21.40 |
| 38 | 10.30 | 12.90 | 11.70 | 15.70 | 15.00 | 19.90 | 23.80 |
| 40 | 11.00 | 14.00 | 13.00 | 17.00 | 17.00 | 22.00 | 26.00 |
| 42 | 13.00 | 16.00 | 14.00 | 19.00 | 18.00 | 24.00 | 29.00 |
| 44 | 14.00 | 17.00 | 16.00 | 21.00 | 20.00 | 27.00 | 32.00 |
| 46 | 15.00 | 19.00 | 17.00 | 23.00 | 22.00 | 29.00 | 35.00 |
| 48 | 16.00 | 21.00 | 19.00 | 25.00 | 24.00 | 32.00 | 38.00 |
| 50 | 18.00 | 22.00 | 20.00 | 27.00 | 26.00 | 34.00 | 41.00 |
| 52 | 19.00 | 24.00 | 22.00 | 29.00 | 28.00 | 37.00 | 45.00 |
| 54 | 21.00 | 26.00 | 24.00 | 32.00 | 30.00 | 40.00 | 48.00 |

The separator can contain silica particles of either precipitated silica, fumed silica, or silica gel powders of 10 m²/g to 1500 m²/g having a high structural morphology. High structural morphology refers to increased surface area of meso-, micro- and macro-porous or networked or fluffy structured silica. In certain embodiments, the particles can have a high surface area, for instance, greater than 100 m²/g, 110 m²/g, 120 m²/g, 130 m²/g, 140 m²/g, 150 m²/g, 160 m²/g, 170 m²/g, 180 m²/g, 190 m²/g, 200 m²/g, 210 m²/g, 220 m²/g, 230 m²/g, 240 m²/g, or 250 m²/g or even much higher as noted above. A silica with high structural morphology may have a high oil absorption rate, for instance, greater than about 150 ml/100 mg, 175 ml/100 mg, 200 ml/100 mg, 225 ml/100 mg, 250 ml/100 mg, 275 ml/100 mg, 300 ml/100 mg, 325 ml/100 mg, or 350 ml/100 mg. However, silica having a lower or low oil absorption rate may also be employed in making the battery separators described herein.

In some selected embodiments, the silica has an average particle size less than 50 μm, 20 μm, 10 μm, 5 μm, 4.5 μm, 4.0 μm, 3.5 μm, 3.0 μm, 2.5 μm, 2.0 μm, 1.5 μm, 1.0 μm, or 0.5 μm. In some selected embodiments, the silica has an average particle size of at least 0.5 μm, 1.0 μm, 1.5 μm, 2.0 μm, 2.5 μm, 3.0 μm, 3.5 μm, 4.0 μm, 4.5 μm or 5 μm. In certain selected embodiments, the silica particle size is selected so that the particles do not congregate within the intra-fiber or inter-fiber spaces. In such embodiments, acid wicking is enhanced by the presence of the open spaces. While not wishing to be bound by theory, in various embodiments, the silica particle is flocculated in a binder so that it essentially increases in size. Binder can precipitate around silica or silica can precipitate with other silica particles and may become coated with binder or binder alone could precipitate and form particulates. Such a flocculate might get caught in the open spaces formed by various networks of fibers and settle thereby forming a composite mat. During settling on the formation wire, for example, in a wet-laid process of making a nonwoven composite fiber mat, fibers, fillers, binders are settling together, and fillers are being caught in between the network of all of these materials and settling there, all of which ultimately is forming a web on the formation wire In certain selected embodiments, the silica or other porous ceramic dielectric materials can be flocculated with binders prior to combining with the fibers. In certain embodiments, flocculants may be multivalent cations such as Al, Ca, or Mg. These positively charged molecules interact with negatively charged particles and molecules to reduce the barrier to aggregation. The ions are chosen in such a way that they do not interfere with the lead acid battery electrochemistry. Many of these chemicals under appropriate pH and salinity react with water to form insoluble hydroxides which, upon precipitating, link together to form long chains, physically trapping small particles to the larger floc. Flocculating agents are aluminum, aluminum chlorohydrate, aluminum sulfate, calcium oxide, calcium hydroxide, polyacrylamide, sodium aluminate, sodium silicate and natural flocculants (such as chitosan, gelatin and guar gum). Suitable flocculating agents include acids such as sulfuric acid or Superfloc® flocculants and/or coagulants. Neutral or ionic surfactants can also be used to flocculate silica particles. Polyethylene oxide can also be used as flocculant. The flocculant's main effect is to disturb the stability of the colloidal solution formed by silica in binder and cause precipitation.

In some embodiments, a binder is included in making the composite separator. The binder bonds together the fibers, the silica, other particles, etc. as part of the composite mat or separator. The binder should not fill all free spaces and/or pores in the composite or system, and the binder content in the system is adjusted to ensure the same (e.g., in some embodiments having about 10% or less binder in the materials used to make the composite separator). In some embodiments, the binder is an aqueous binder and/or is soluble or miscible in water. In some embodiments, the binder is a latex or rubber particle. The binder can be an acrylic binder, by way of example, styrene acrylate, or poly methyl (meth) acrylate dispersion or emulsion. In other embodiments, the binder may include GMA (glycidyl methylene acrylate) which when treated with radiation will cross-link and/or cure and hold the fibers and particles together. The binders useful herein include the self-crosslinking or self-curing types as well as those binders that are cross-linkable or curable by radiation (such as e-beam radiation, ultraviolet (UV) energy, infrared (IR) radiation, and so forth). The binder can be a water-based acrylic. In addition, in other embodiments, the binder may be water-based epoxy. In other embodiments, the binder may be a polyurethane emulsion or phenol formaldehyde or cresol resin. Various binders, such as those described above, are electrochemically neutral in the battery system and may provide improved puncture resistance to the battery separators described herein. In particular, when a binder is used that is cured and/or cross-linked, the resulting separator or separator layer may have significantly improved puncture resistance. When thermosetting polymeric binders such as epoxy or phenol formaldehyde or resol resins are used, the stiffness of the composite mat becomes very high, similar, by way of example only, to certain commercial separators available from Daramic, LLC of Charlotte, North Carolina, such as Daramic® DARAK separator product lines. When stiffness is high, the mats provide excellent PAM support and/or PAM retention and/or reduced PAM shedding. In certain very specific embodiments, where a significantly higher puncture resistance is obtained for the composite separator or the composite separator layer herein, the separator is preferably used in leaf format or cut piece format rather than, for example, a wrap, sleeve, or envelope format. Due to the polar nature of the binder, the electrical resistance (ER) of separator is also low.

In some embodiments, the binder can be any polymer in suspension in water (for example, for a wet-laid nonwoven process). The suspension can be disturbed by changing the pH of the solution or the suspension. The pH change may result in coagulation (and/or flocculation) of particles that may be a combination of both binder and silica. The particle size of silica increases to an extent that it settles between various networks of fibers. In certain embodiments, the binder(s) used to make the composite separator has equal affinity to the fibers, the silica, the particles, any fillers, and the like used to make the composite separator. In other embodiments, a binder is selected to have a stronger affinity for one or more of these components (versus the other component(s)) in the composite separator. In these embodiments, the composite mat or separator may be formed with certain channels to enhance wicking and/or enhance acid diffusion.

In certain embodiments, the silica is flocculated in the polymeric binder and then combined with fibers. In certain embodiments, the silica is flocculated in a suspension with approximately neutral pH, while in other embodiments, the silica is flocculated in an acidic medium, such as sulfuric acid. A zeolite can be added to the mixture as one of the filler materials, thereby providing zeolites entangled within the composite mat. The zeolite reduces metal and metalloid movement through the composite, thereby reducing metal induced oxidation, antimony poisoning and the like. The mixture may also include minor amounts of other additives or agents as is common in the separator arts (such as wetting agents, colorants, antistatic additives, and/or the like).

Other various filler(s) may be used in various embodiments of the present disclosure. By way of example only, a filler that may be used in place of some silica within the separator or the composite separator may include titania, lignin sulfonate, barium sulfate, milled glass powder, PVC particles, phenolic resin particles, cellulosic particles, alumina particles, natural, synthetic, organic, and/or inorganic particles, fibers, and/or pieces, and/or the like, and combinations thereof.

The flocculated silica mixture may be combined with fibers, optionally blended for a period of 10, 20, 30, 45, 60, 75, 90 or 120 seconds, and then wet laid or air laid on a conveyor belt to obtain the composite mat. The mat may be washed with water, dilute acid (e.g., pH of about 1, 2, 3, 4 or 5) or other binder solution to bind the silica and the fibers and/or to remove the binder. Suction may be applied through the conveyor belt to further remove binder and/or compress the fiber/silica blend. In some embodiments, substantially most of the binder is removed, while in other embodiments the binder remains in the composite mat to a different degree. For example, in some embodiments, there is no washing with water or acid as such might remove too much of the binder or remove the binder to an undesirable extent. Furthermore, in certain embodiments, the flocculated silica mixture already contains binder, and the composite mat can be cured as-is. The conveyor belt may be substantially flat, or may have areas of negative or positive relief to impart ribs or other embossments into the composite mat.

The flocculated mixture can be added as second step also. In such embodiments, formed first is the interpenetrating network of fibers. Then the flocculated mixture of silica may be added. In such instances, the silica particles may not distribute uniformly through thickness direction, which may be desirable for various embodiments. By way of example only, if a mixture of flocculated silica is allowed to settle for a longer period of time, one side of the resulting mat may have less silica and more fibers, and in certain cases, one side of the resulting mat may appear to have no silica and only fibers. Such a feature may be desirable in certain instances, as the surface next to positive plate may desirably have more fiber or fiber alone to reduce or eliminate acid stratification.

In certain selected embodiments, the fibers are formed into a mat, and the flocculated silica/binder mixture is added thereto. The fibrous mat may be dipped in the flocculated silica/binder mixture, or the mixture may be coated onto the surface of the mat.

In some selected embodiments, the separator or fibrous layer may be made by
 a) preparing a mixture comprising fibers, polymeric binder and flocculated silica, and
 b) forming a non-woven composite from the mixture.

A plurality of zeolite particles may be added to the mixture to give a composite mat containing zeolites. In some embodiments, this may also include, in addition to such zeolites, or in place of such zeolites, aluminates, silicates, alumina, etc. The non-woven composite may be formed with the application of suction to remove some or all of the binder.

In some selected embodiments, the separator may be made by
 a) providing a glass fibrous mat;
 b) forming an impregnation mixture comprising flocculated silica and polymeric binder; and
 c) impregnating the glass fibers with the impregnation mixture.

The impregnation step can be performed by blending with fiber or as an after process such as spraying, curtain coating, dip and squeeze, foulard (i.e., foaming without pressure) or foaming under pressure. Spraying a binder, for example, an acrylic binder, may provide the web with improved strength and/or integrity. The glass fibrous mat and/or the impregnation mixture may contain one of more of zeolites or other additives as described above.

In certain selected embodiments, the composite mat is further cured.

After the composite mat is formed, it can be further compressed using either a machine press or calender stack. According to certain selected embodiments, the composite separator has a thickness that is less than about 2.0 mm, 1.0 mm, 0.9 mm, 0.8 mm, 0.7 mm, 0.6 mm, 0.5 mm, 0.4 mm, 0.3 mm, 0.2 mm, or 0.1 mm. In some selected embodiments, the composite separator has a thickness from about 0.1-1.0 mm, 0.1-0.5 mm, 0.1-0.4 mm, or 0.1-0.3 mm. As a result of the calendering process, the composite mat can have different surface features (e.g., ribs, serrations, embossed features, etc.). For example, a calender roll may be ribbed to provide the separator layer or layers with increased overall thickness. Additionally, the calender roll may have a specific profile design thereon to provide a given profile to the separator. The calender roll may be a corrugated and/or embossing roll to provide a flat sheet layer of the separator and/or an already-ribbed portion of the separator with a higher overall thickness.

The separators disclosed herein can have a final porosity greater than 50%, 55%, 60%, 65%, 70%, 75%, 80% or 85%. Porosity may be measured using gas or liquid porometer and mercury porosimeter. The composite separator can have a median or average pore size no greater than 10 µm, 9 µm, 8 µm, 7 µm, 6 µm, 5 µm, 4 µm, 3 µm, 2 µm or 1 µm. The composite can have an average pore size of at least 1 µm, 2 µm, 3 µm, 4 µm, 5 µm, 6 µm, 7 µm, 8 µm, 9 µm, or 10 µm. The minimum pore size of the composite separator can be no less than 0.5 µm, 1.0 µm, 1.5 µm, 2.0 µm, 2.5 µm, 3.0 µm, 3.5 µm, 4.0 µm or 5.0 µm. The maximum pore size of the composite separator can be no greater than 50 µm, 40 µm, 30 µm, 25 µm, 20 µm, 17.5 µm, 15 µm, 12.5 µm, or 10 µm.

In certain embodiments, the separator can have ribs on at least one face. The ribs can facilitate processing during the formation of the composite and/or folding steps, decrease acid stratification, and/or promote acid mixing and increase acid diffusion at the boundary layer between the electrode and bulk electrolyte. In accordance with at least another object of the present invention, there is provided a porous composite separator with cross-ribs. Cross ribs refer to ribs which extend in a direction other than the vertical edges of the separator. In some embodiments of the present invention, the cross ribs can have a rib height of at least 0.005 mm, 0.01 mm, 0.025 mm, 0.05 mm, 0.075 mm, 0.1 mm, 0.2 mm, 0.3 mm, 0.4 mm, 0.5 mm, 0.6 mm, 0.7 mm, 0.8 mm, 0.9 mm, or 1.0 mm or 2 mm. The total thickness of the separator can be adjusted by changing the rib height for the given backweb (or back web) thickness. The separator can have a cross-rib height between 0.005-1.0 mm, 0.01-0.5 mm, 0.025-0.5 mm, 0.05-0.5 mm, 0.075-0.5 mm, 0.1-0.5 mm, 0.2-0.4 mm, 0.3-0.5 mm, 0.4-0.5 mm. Other ribs or embossments can be formed by embossing or over-embossing rolls or rollers. The ribs may be made of any polymeric materials and can be dispensed or formed on the surface of the film, sheet or fiber mat and cured, or may be formed during the process of forming the film, sheet or fiber mat through the calendering process (or may be embossed ribs formed after calendering).

The separator or fibrous layer or layer surface(s) may contain one or more performance enhancing additives, for instance hydrophilic coating. The hydrophilic coating can include a surfactant. Suitable surfactants include surfactants such as salts of alkyl sulfates; alkylarylsulfonate salts; alkylphenol-alkylene oxide addition products; soaps; alkyl-naphthalene-sulfonate salts; dialkyl esters of sulfo-succinate salts; quaternary amines; block copolymers of ethylene oxide and propylene oxide; and salts of mono and dialkyl phosphate esters. The additive can be an anionic surfactant. In addition, in certain embodiments, the additive can be a non-ionic surfactant such as polyol fatty acid esters, polyethoxylated esters, polyethoxylated alcohols, polyethylene oxide (PEO), alkyl polysaccharides such as alkyl polyglycosides, acid-soluble sugars, and blends thereof, amine ethoxylates, sorbitan fatty acid ester ethoxylates, organosilicone based surfactants, ethylene vinyl acetate terpolymers, ethoxylated alkyl aryl phosphate esters, sucrose esters of fatty acids, organic acids such as succinic acid and hydroxy acids. In embodiments of the present disclosure in which a composite separator is made as a nonwoven mat, these types of additives may be added to create benefits such as reducing antimony poisoning. In embodiments of the present disclosure in which a composite separator is made as a nonwoven mat laminated to or juxtaposed with a polyethylene-based separator membrane, these types of additives may create benefits such as surfactants would (increased wetting with electrolyte). The additive or surfactant used in various embodiments of the present invention may be a surfactant having a relatively low HLB value. For example, in certain embodiments herein, the surfactant used has an HLB value of lower than about 6, in some embodiments, lower than about 5, in some embodiments, lower than about 4, and in other embodiments, lower than about 3, in still other embodiments, lower than about 2, and in yet other embodiments, lower than or equal to about 1. As is known in the art, an "HLB" value refers to the hydrophile lipophile balance of the given material. In some embodiments, the additive or surfactant, is insoluble or only difficulty soluble in each of water and sulphuric acid. In still other embodiments of the present invention, the surfactant is one that is more hydrophobic in its characteristics than hydrophilic. In other embodiments, the surfactant used herein may be one that is an oil-soluble or organic-soluble surfactant. In other various particular embodiments, the surfactant is one that is not soluble in water, aqueous solution, or sulphuric acid and has an HLB value of from about 1 to about 3. In other embodiments, the surfactant used herein is one that is not soluble or only difficulty soluble in water, aqueous solution, or sulphuric acid and has an HLB value of less than about 6, preferably less than about 5. In other various embodiments of the present invention, the surfactant or surfactants added to (or coated onto) the battery separator or fibrous layer is one or more surfactants having an HLB value of about 3 or less.

The battery separators or fibrous layers can be provided in various ways with the additive, agents, fillers, or additives. The additives can for example be applied to the separator when it is finished and/or added to the mixture used to produce the separator. The additive can be present at a density of at least about 0.5 g/m², 1.0 g/m², 1.5 g/m², 2.0 g/m², 2.5 g/m², 3.0 g/m², 3.5 g/m², 4.0 g/m², 4.5 g/m², 5.0 g/m², 5.5 g/m², 6.0 g/m², 6.5 g/m², 7.0 g/m², 7.5 g/m², 8.0 g/m², 8.5 g/m², 9.0 g/m², 9.5 g/m², or 10.0 g/m². The additive can be present on the separator at a density between about 0.5-10 g/m², 1.0-10.0 g/m², 1.5-10.0 g/m², 2.0-10.0 g/m², 2.5-10.0 g/m², 3.0-10.0 g/m², 3.5-10.0 g/m², 4.0-10.0 g/m², 4.5-10.0 g/m², 5.0-10.0 g/m², 5.5-10.0 g/m², 6.0-10.0 g/m², 6.5-10.0 g/m², 7.0-10.0 g/m², 7.5-10.0 g/m², 5.0-10.5 g/m², 5.0-11.0 g/m², 5.0-12.0 g/m², or 5.0-15.0 g/m².

The application may also take place by dipping the battery separator in the additive or a solution of the additive and subsequently optionally removing the solvent, e.g. by drying.

In certain embodiments, the additive may be represented by a compound of Formula (I)

$$R(OR^1)_n(COOM_{1/x}{}^{x+})_m \qquad (I)$$

in which:
R is a linear or non-aromatic hydrocarbon radical with 10 to 4200 carbon atoms, preferably 13 to 4200, which may be interrupted by oxygen atoms;
$R^1$=H, $-(CH_2)_k COOM_{1/x}{}^{x+}$, or $-(CH_2)_k-SO_3M_{1/x}{}^{x+}$, preferably H, where k=1 or 2;
M is an alkali metal or alkaline-earth metal ion, H⁺ or NH₄⁺, where not all the variables M simultaneously have the meaning H⁺;
n=0 or 1;
m=0 or an integer from 10 to 1400; and
x=1 or 2.

The ratio of oxygen atoms to carbon atoms in the compound according to Formula (I) being in the range from 1:1.5 to 1:30 and m and n not being able to simultaneously be 0. However, preferably only one of the variables n and m is different from 0.

By non-aromatic hydrocarbon radicals is meant radicals which contain no aromatic groups or which themselves represent one. The hydrocarbon radicals may be interrupted by oxygen atoms (i.e., contain one or more ether groups). R is preferably a straight-chain or branched aliphatic hydrocarbon radical which may be interrupted by oxygen atoms. Saturated, uncross-linked hydrocarbon radicals are quite particularly preferred. However, as noted above, R may, in certain embodiments, be aromatic ring-containing.

Through the use of the compounds of Formula (I) for the production of battery separators, they may be effectively protected against oxidative destruction.

Battery separators are preferred which contain a compound according to Formula (I) in which:
R is a hydrocarbon radical with 10 to 180, preferably 12 to 75 and quite particularly preferably 14 to 40 carbon atoms, which may be interrupted by 1 to 60, preferably 1 to 20 and quite particularly preferably 1 to 8 oxygen atoms, particularly preferably a hydrocarbon radical of formula

$R^2-[OC_2H_4)_p(OC_3H_6)_q]-$, in which:

$R^2$ is an alkyl radical with 10 to 30 carbon atoms, preferably 12 to 25, particularly preferably 14 to 20 carbon atoms, wherein $R^2$ can be linear or non-linear such as containing an aromatic ring;
P is an integer from 0 to 30, preferably 0 to 10, particularly preferably 0 to 4; and
q is an integer from 0 to 30, preferably 0 to 10, particularly preferably 0 to 4;
compounds being particularly preferred in which the sum of p and q is 0 to 10, in particular 0 to 4;
n=1; and
m=0.

Formula $R^2-[OC_2H_4)_p(OC_3H_6)_q]-$ is to be understood as also including those compounds in which the sequence of the groups in square brackets differs from that shown. For example according to the invention compounds are suitable in which the radical in brackets is formed by alternating ($OC_2H_4$) and ($OC_3H_6$) groups.

Additives in which $R^2$ is a straight-chain or branched alkyl radical with 10 to 20, preferably 14 to 18 carbon atoms have proved to be particularly advantageous. $OC_2H_4$ preferably stands for $OCH_2CH_2$, $OC_3H_6$ for $OCH(CH_3)_2$ and/or $OCH_2CH_2CH_3$.

As preferred additives there may be mentioned in particular alcohols (p=q=0; m=0) primary alcohols being particularly preferred, fatty alcohol ethoxylates (p=1 to 4, q=0), fatty alcohol propoxylates (p=0; q=1 to 4) and fatty alcohol alkoxylates (p=1 to 2; q=1 to 4) ethoxylates of primary alcohols being preferred. The fatty alcohol alkoxylates are for example accessible through reaction of the corresponding alcohols with ethylene oxide or propylene oxide.

Additives of the type m=0 which are not, or only difficulty, soluble in water and sulphuric acid have proved to be particularly advantageous.

Also preferred are additives which contain a compound according to Formula (I), in which:
R is an alkane radical with 20 to 4200, preferably 50 to 750 and quite particularly preferably 80 to 225 carbon atoms;

M is an alkali metal or alkaline-earth metal ion, $H^+$ or $NH_4^+$, in particular an alkali metal ion such as $Li^+$, $Na^+$ and $K^+$ or $H^+$, where not all the variables M simultaneously have the meaning $H^+$;

n=0;

m is an integer from 10 to 1400; and x=1 or 2.

As suitable additives there may be mentioned here in particular polyacrylic acids, polymethacrylic acids and acrylic acid-methacrylic acid copolymers, whose acid groups are at least partly, i.e. preferably 40%, particularly preferably 80%, neutralized. The percentage refers to the number of acid groups. Quite particularly preferred are poly(meth)acrylic acids which are present entirely in the salt form. By poly(meth)acrylic acids are meant polyacrylic acids, polymethacrylic acids and acrylic acid-methacrylic acid copolymers. Poly(meth)acrylic acids are preferred and in particular polyacrylic acids with an average molar mass Mw of 1,000 to 100,000 g/mol, particularly preferably 1,000 to 15,000 g/mol and quite particularly preferably 1,000 to 4,000 g/mol. The molecular weight of the poly(meth)acrylic acid polymers and copolymers is ascertained by measuring the viscosity of a 1% aqueous solution, neutralized with sodium hydroxide solution, of the polymer (Fikentscher's constant).

Also suitable are copolymers of (meth)acrylic acid, in particular copolymers which, besides (meth)acrylic acid contain ethylene, maleic acid, methyl acrylate, ethyl acrylate, butyl acrylate and/or ethylhexyl acrylate as comonomer. Copolymers are preferred which contain at least 40 wt.-%, preferably at least 80 wt.-% (meth)acrylic acid monomer, the percentages being based on the acid form of the monomers or polymers.

To neutralize the polyacrylic acid polymers and copolymers, alkali metal and alkaline-earth metal hydroxides such as potassium hydroxide and in particular sodium hydroxide are particularly suitable.

In some selected embodiments, the microporous separator can have a greater proportion of larger pores while maintaining the average pore size no greater than about 1 µm, 0.9 µm, 0.8 µm, 0.7 µm, 0.6 µm, or 0.5 µm. In some instances, the pore size can be increased by stretching or otherwise physically manipulating the separator post-extrusion.

In certain selected embodiments, the separator or fibrous layer may further contain one or more phosphate induced metal stabilization materials (often referred to as PIMS material or PIMS mineral). By way of example only, a PIMS mineral derived from fish bone (such as commercial, lab ground fish meal) has been shown to have greatest affinity for metal ions. In accordance with at least certain embodiments, it is preferred that the fish bone powder be added to substitute for a portion of the silica at substitution levels of about 1% to 20% of the silica, more preferably about 2% to 10%, and most preferably at about 2% to 5%. In accordance with at least other certain embodiments, it is preferred that the ground fish bone powder (ground fish meal) be added to substitute for a portion of the silica at substitution levels of about 1% to 50% or more of the silica, more preferably about 5% to 30%, and most preferably at about 10% to 20%.

Besides reducing metalloid poisoning and acid stratification, preferred separators are also designed to bring other benefits. In particular, the composite separators according to the present invention, made as a stand-alone nonwoven mat and/or a nonwoven mat used with a polymer or polyethylene membrane, may provide increased protection against dendrite growth through the separator. In addition, with regard to assembly, the separators are more easily passed through processing equipment, and therefore more efficiently manufactured. To prevent shorts during high speed assembly and later in life, the separators may have superior puncture and oxidation resistance when compared to standard PE separators. The separators described herein (stand-alone nonwoven separators and/or one or more nonwoven separator mat layer(s) combined with one or more polymer or polyethylene film or membrane layer(s)) may be in various formats, such as a cut piece, an envelope, a sleeve, a pocket, or the like. For embodiments where the separator is an envelope, sleeve, pocket, or the like, it may wrap the positive and/or negative plate in the lead acid battery. In certain specific embodiments, as the positive and/or negative plate is wrapped with one of the improved separators disclosed herein, it may be further enhanced by the addition of supplemental or additional active material inside the wrap (inside the envelope or pocket or sleeve or the like).

Generally, combined with reduced metalloid poisoning and acid stratification, battery manufacturers are likely to find improved and sustained electrical performance in their batteries with these new separators.

Figures 1A, 1B:
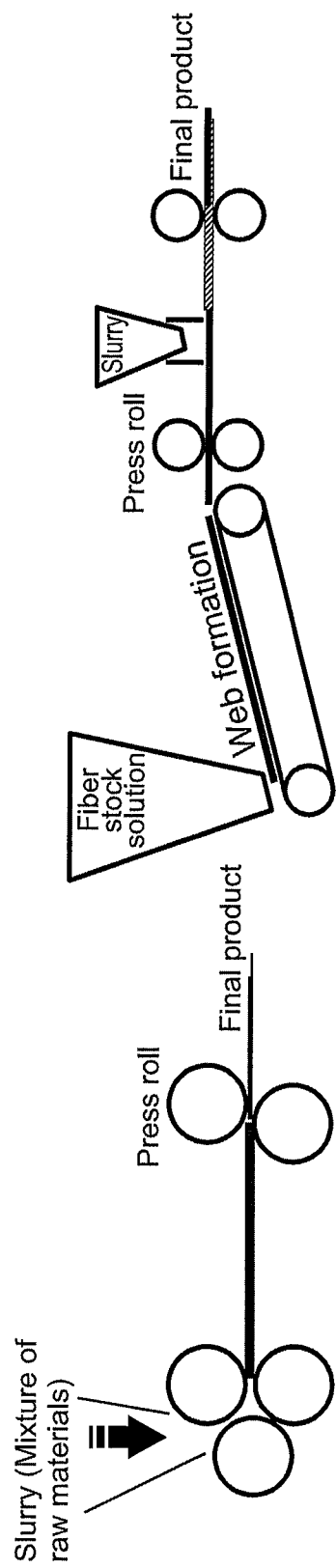
FIGS. 1A and 1B depict various methods of making a composite separator or a layer of a composite separator according to the disclosure herein.

In addition, various specific methods of preparing the battery separators of the present invention may be employed. In one particular embodiment, organic fiber is combined with inorganic fiber and filler in either a dry-laid process or a wet-laid process. For the dry-laid process of this embodiment, depicted generally in FIG. 1A, all of the raw materials are blended (e.g., the inorganic fibers, such as microglass fibers, the organic fibers, such as polyester fibers, the filler(s), such as silica, a thermoplastic resin, such as polybutylene terephthalate (PBT) resin, and a binder, such as acrylate latex, followed by casting and curing. The curing may comprise one or more of e-beam radiation, UV energy curing, IR radiation curing, or the like. For the wet-laid process of this embodiment, depicted generally in FIG. 1B, a fiber stock solution of the blend of organic and organic fibers is formed into a web, which is then loaded with binder and silica slurry, followed by curing.

Figure 2A:
FIG. 2A depicts a woven fabric used in various methods of making a composite separator or a layer of a composite separator, as shown and depicted in FIG. 2B, according to the disclosure herein.
Figure 2B:
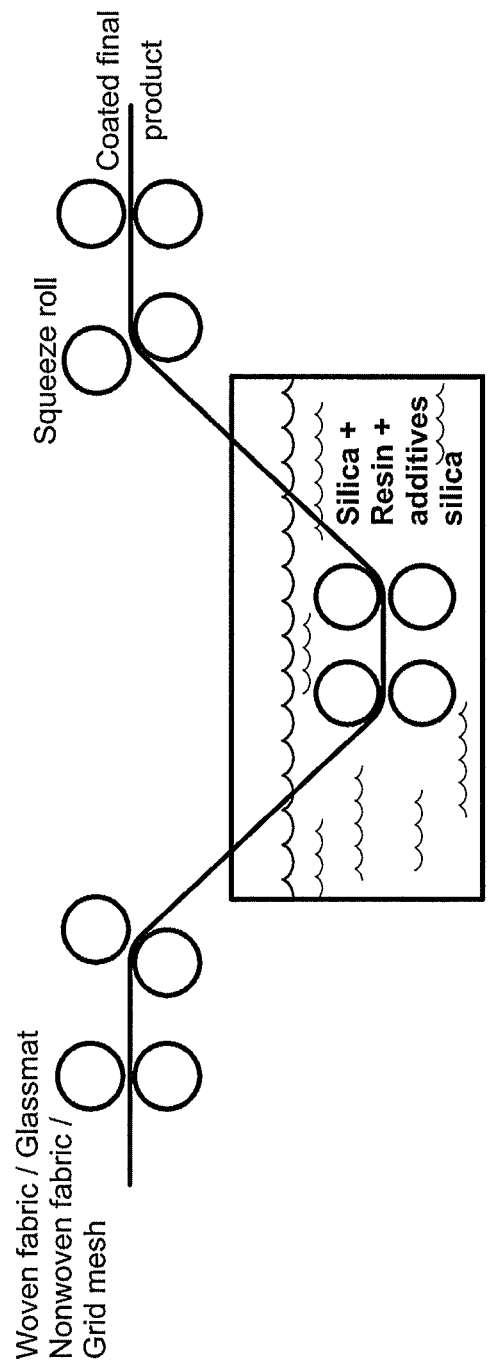

In another embodiment, instead of using glass fiber, a woven inner layer is employed for silica loading. In this embodiment, depicted generally in FIG. 2, a woven fabric (shown generally in FIG. 2A, is loaded with silica, resin, and additives to create a coated final product after a squeeze roll is used (see FIG. 2B). In such an embodiment, the silica employed may be a silica with a lower density than that typically employed in lead acid batteries so that it does not settle in the bath used for silica loading of the woven fabric. In various embodiments similar to this embodiment, rather than the dipping apparatus depicted in FIG. 2B, the separator or separator layer can be made using the same type of woven layer, but with coating, spraying, roller, doctor blade, or the like, used for adding the silica, resin, and additive(s). In such embodiments, the squeeze roll depicted in FIG. 2B may be used in this embodiment as well.

In yet another embodiment, a silica coating is added (surface loaded) to one side, or both sides, of a glass retention mat or a woven fabric or a nonwoven fabric, using a binder, such as an acrylic latex binder. The same is generally depicted in FIG. 3. For various nonwoven mats and/or fabrics in which fibers are already bound by resin, the silica will stay on the top surface of the mat as a coating. For various woven fabrics with more open areas, the binder+ silica will go through the bulk and seal those open areas. Silica will then be located on the surface of the fabric or mat as well as inside the fabric or mat. There can be many variations for the above two cases or embodiments, by way of example only, (1) silica on the surface of a bonded fiber mat, (2) silica homogeneously dispersed in the bulk of a woven mat, (3) silica on the surface in case (1) just above can be squeezed into the bulk giving a gradation of silica into the fiber mat, and so forth. For various nonwoven glass mats, a two-sided coating of the silica slurry is added without impregnation into the bulk of the glass mat. Similarly, for various woven fabrics, a two-sided application of the silica slurry is applied to the woven fabric. In the embodiments reflected herein where silica slurry is impregnated into a fabric or mat, such is done by pushing the slurry inside of the substrate (the fabric or mat). Within these processes, the pre-press roll may imprint or curl the substrate to create surface irregularity which may be helpful in ensuring adhesion of the silica coating on the surface of the substrate. Similarly, in certain embodiments, such a press roll may be designed with patterns or undulations to impart irregularity to the surface of the substrate prior to coating. In addition, in each one of these embodiments, the silica slurry may also contain fibers, such as microglass fibers, to form a composite coating that includes not only silica and resin binder but also glass fiber.

EXAMPLES

The following examples further illustrate at least selected separator or fibrous layer embodiments of the instant invention.

Example 1

About 1.0 g of glass fibers (by way of example only, glass fibers commercially available as Johns Manville Microstrand 100 or 200 series fibers) with a diameter in the range from about 0.2 µm to about 0.8 µm are dispersed in a liter of water by using a blender. After blending for 30 minutes, this mixture is dropped in a tank with a formation wire fixed at the bottom. The content is diluted further to get 0.01% of glass fiber in water. In a separate beaker, 10 g of precipitated silica is weighed and to this 4 g of binder (by way of example only, Rhoplex HA-16) is added. The entire mixture is diluted with 200 ml of water. To this mixture, dilute sulfuric is added in drops until the clear liquid turns cloudy indicating coagulation or flocculation of binder around silica. This mixture is dropped into the tank containing glass fiber and the whole mixture is stirred to make it homogeneous. The water is then drained by applying suction from the bottom of the tank. The fibers, particles and binders settle at the bottom on top of the formation wire to form the web. This is placed in an oven at 60° C. to drive the remaining water off. The dried web is transferred to a different wire and the web is cured at 140° C. to crosslink binders around silica and fibers. The final product is the mat formed by the wetlaid process as described above.

Example 2

About 1.0 g of glass fibers (for example Johns Manville Microstrand 100 or 200 series) with diameter in the range from about 0.2 µm to about 0.8 µm is combined together with about 0.1 g of synthetic polyester staple fiber and dispersed in water by using a blender. After blending for 30 minutes, this mixture is dropped in a tank with a formation wire fixed at the bottom. The content is diluted further to get 0.01% of glass fiber in water. In a separate beaker, 10 g of precipitated silica is weighed and to this 4 µm of binder (for example Rhoplex HA-16) is added. The entire mixture is diluted with 200 ml of water. To this mixture, dilute sulfuric is added in drops until the clear liquid turns cloudy indicating coagulation or flocculation of binder around silica. This mixture is dropped into the tank containing glass fiber and the whole mixture is stirred to make it homogeneous. The water is then drained by applying suction from the bottom of the tank. The fibers, particles and binders settle at the bottom on top of the formation wire, producing a web that may contain around 30% of water. The water is further removed by vacuum suction. The web is then placed in an oven at 60° C. to drive the remaining water off. The dried web is transferred to a different wire and the web is cured at 140° C. to crosslink binders around silica and fibers. The resulting product is the mat formed by wetlaid process as described above.

Example 3

About 2.0 g of glass fibers (for example Johns Manville Microstrand 100 or 200 series) with diameter in the range from about 0.2 µm to about 0.8 µm together with about 0.1 g of synthetic polyester staple fiber are dispersed in 1.0 L of water in a blender. After blending for 60 minutes, this is mixed with acid flocculated silica in binder from example #1. The entire mixture is diluted with 4 liters of water. This mixture is dropped over a moving Teflon formation wire carrier which is either flat or inclined to drain water quickly by gravity and suction. The web on the moving formation wire is passed through a furnace kept at 160° C. When the web moves through the furnace, the binder gets cured and crosslinked. Curing results in binder crosslinking around silica and fiber network holding them all together intact. The mat thus formed will have the enhanced strength to be used in lead acid batteries either as stand-alone separator or mat and/or as laminate or adjacent material or layer with a polymer or polyethylene membrane, film, or separator. For the latter case, the fiber mat may be attached to a polyethylene separator by lamination or bonding, such as by epoxy lamination process, known in the industry.

Example 4

About 2.0 g of glass fibers (for example Johns Manville Microstrand 100 or 200 series) with diameter in the range from about 0.2 µm to about 0.8 µm together with about 0.1 g of synthetic polyester staple fiber are dispersed in 1.0 L of water in a blender. The fiber is diluted further to get 0.01% solution of fiber in water. This is formed on the moving formation wire and extra water is removed by suction. The water is removed to an extent of less than 10% on the web. Using a roller flocculated mixture of binder with silica is flooded onto the web. The extra binder is sucked from the bottom of the web to be returned to the binder/silica tank. Web with binder and silica mixture is fed through the furnace and the whole assembly is cured at about 140° C. to about 160° C. for 5 minutes. The mat thus formed is fed between calendering rolls and pressed together to the final thickness. The desired thickness is in the range from about 0.45 mm to about 0.85 mm.

Example 5

About 2.0 g of glass fibers (for example Johns Manville Microstrand 100 or 200 series) with diameter in the range from about 0.2 µm to about 0.8 µm together with about 0.1 g of synthetic polyester staple fiber are dispersed in 1.0 L of water in a blender. The fiber is diluted further to get 0.01% solution of fiber in water. This is formed on the moving formation wire and extra water is removed by suction. The water is removed to an extent of less than 5% on the web. The semi-dry web is sprayed with a mixture of binder and silica in water. Suction is enabled to remove extra water, and the web is dried in oven and cured thereafter at 140° C. for 5 minutes. The mat is passed through the calendering rollers at the end of the line to press the material to final form with a fixed thickness.

Example 6

About 1.0 g of glass fibers (for example Johns Manville Microstrand 100 or 200 series) with diameter in the range from about 0.2 µm to about 0.8 µm together with about 0.1 g of synthetic polyester staple fiber are dispersed in water by using a blender. Fiber web is formed on a moving formation wire and dried to less than 5% water. Flocculated silica in phenol-formaldehyde binder resin at a compositional weight ratio of 6:1 is applied to this dry web, and excess binder is removed from the carrier wire by suction. The web with silica and resin is cured in furnace at <200° C. for 5 minutes. The mat thus formed is rigid and chopped into cut pieces instead of in roll format.

Example 7

About 1.0 g of glass fibers (for example Johns Manville Microstrand 100 or 200 series) with diameter in the range from about 0.2 µm to about 0.8 µm together with about 0.1 g of synthetic polyester staple fiber are dispersed in water by using a blender. Fiber web is formed on a moving formation wire and dried to less than 5% water. Silica in phenol-formaldehyde binder resin at a compositional weight ratio of 6:1 is applied to this dry web by using a roller loaded with the mixture. The excess binder is removed from the carrier wire by suction. The web with silica and resin is cured in furnace at less than approximately 200° C. for 5 minutes. The mat thus formed is rigid and chopped into cut pieces instead of in roll format.

Example 8

Flocculated silica similar to that described in the examples above together with binder is applied by roller coat method on a woven polyester mesh with a starting basis weight of about 60 g/m$^2$. The openings in the mesh retain silica and binder. This loaded mesh is pressed between two rollers to a fixed thickness decided by the gap between the rollers. The mesh thus pressed will have a high density of greater than 130 g/m$^2$. This densified pressed mat is cured at 160° C. to form the final woven separator.

In certain Examples noted above, the binder used is Rhoplex HA-16, commercially available from Dow Chemicals. Its pH is around 2.6. When silica is mixed with this binder and acid is added, the pH will drop and destabilize the emulsion resulting in flocculation. When flocculation happens, binder traps silica with it forming huge particles or flocculates. The big particles have difficulty to pass through the network and therefore get trapped easily in the network forming composite mat. If flocculation is not done, then individual silica particles may have easy access through fiber networks and may leave the mat through the formation wire. Thus, in various embodiments that may be preferred herein, in order to make a desirable composite mat, silica should be a big particle or particles, and flocculation is preferred. It is also possible to obtain silica particles as aggregates or agglomerates with the right or desired size that do not disperse into smaller particles in water in a wet laid nonwoven process, such as the processes described herein. In such cases, flocculation may not be required.

The silica-loaded nonwoven glass fiber separator mat disclosed herein provides many different advantages to lead acid batteries as has been shown and described herein.

In accordance with at least selected embodiments, aspects or objects, the present disclosure or invention is directed to novel or improved mats, fibrous layers, separators, fibrous separators, composite separators, composite mat separators, composite mat separators containing fibers and silica particles, battery separators, lead acid battery separators, plate wraps, and/or pasting papers, and/or batteries, cells, plates, and/or methods of manufacture and/or use of such mats, layers, separators, battery separators, lead acid battery separators, papers, wraps, batteries, plates, plate systems, wrapped plates, pocketed plates, and/or cells, as well as vehicles, systems, or devices containing the same. In accordance with at least certain embodiments, the present disclosure or invention is directed to novel or improved enhanced composite separators for lead acid batteries, and/or improved methods of making and/or using such improved separators, cells, batteries, systems, vehicles, and/or the like. In accordance with at least certain embodiments, the present disclosure or invention is directed to an improved composite separator for lead acid batteries and/or improved methods of using such batteries having such improved separators. In accordance with at least selected embodiments, the present disclosure or invention is directed to composite separators, particularly separators for lead acid batteries, flooded batteries, enhanced flooded batteries, dry charge batteries, and/or the like. In addition, disclosed herein are methods, systems and battery separators for enhancing battery life, decreasing shorting, reducing water loss, increasing wettability, reducing acid stratification, improving acid diffusion, reducing active material shedding, reducing metal induced oxidation, reducing oxidation, reducing heavy metal and/or metalloid poisoning, reducing antimony poisoning, increasing antimony suppression, and/or improving uniformity in one or more lead acid batteries. In accordance with at least particular embodiments, the present disclosure or invention is directed to an improved separator for lead acid batteries wherein the separator includes fibers, one or more binders, silica particles, fillers, additives, surfactants, coatings and/or the like.

Disclosed herein are novel or improved mats, fibrous layers, composites, composite separators, separators, battery separators, lead acid battery separators, wraps, sleeves, envelopes, pockets, pasting papers, and/or flooded lead acid battery separators, and/or batteries, cells, and/or methods of manufacture and/or use of such mats, fibrous layers, composites, composite separators, separators, battery separators, lead acid battery separators, wraps, papers, cells, plates, wrapped plates, plate systems, pocketed plates, and/or batteries. In addition, disclosed herein are methods, systems, and battery separators for enhancing battery life, reducing internal resistance, reducing metalloid poisoning, reducing acid stratification, and/or improving uniformity in at least enhanced flooded batteries. In accordance with at least particular embodiments, the present disclosure or invention is directed to an improved separator for lead acid batteries wherein the separator is a composite mat containing fibers and silica particles.

Also disclosed or contemplated are novel or improved lead acid battery separator containing at least one separator layer or material comprising a composite or composite layer of fibers and particles, of fibers and binder including particles, of fibers and agglomerated particles, of fibers and flocculated particles, of fibers and binder flocculated particles, of particle-binder mixture impregnated on nonwoven or woven glass or synthetic mat, of particle impregnated on a mesh or net, of fibers, a mesh and particles, or of agglomerated flocculated particles and fibers or a mesh.

The compositions and methods of the appended claims are not limited in scope by the specific compositions and methods described herein, which are intended as illustrations of a few aspects of the claims and any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated. The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" may be used in place of "comprising" and "including" to provide for more specific embodiments of the invention and are also disclosed. Other than in the examples, or where otherwise noted, all numbers expressing quantities of ingredients, reaction conditions, and so forth used in the specification and claims are to be understood at the very least, and not as an attempt to limit the application of the doctrine of equivalents to the scope of the claims, to be construed in light of the number of significant digits and ordinary rounding approaches.

The present invention may be embodied in other forms without departing from the spirit and the essential attributes thereof, and, accordingly, reference should be made to the appended claims, rather than to the foregoing specification, as indicating the scope of the invention. Disclosed are components that may be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that may be performed it is understood that each of these additional steps may be performed with any specific embodiment or combination of embodiments of the disclosed methods.

The foregoing written description of structures and methods has been presented for purposes of illustration only. Examples are used to disclose exemplary embodiments, including the best mode, and also to enable any person skilled in the art to practice the invention, including making and using any devices or systems and performing any incorporated methods. These examples are not intended to be exhaustive or to limit the invention to the precise steps and/or forms disclosed, and many modifications and variations are possible in light of the above teaching. Features described herein may be combined in any combination. Steps of a method described herein may be performed in any sequence that is physically possible. The patentable scope of the invention is defined by the appended claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The compositions and methods of the appended claims are not limited in scope by the specific compositions and methods described herein, which are intended as illustrations of a few aspects of the claims. Any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

As used in the specification and the appended claims, the singular forms "a," "an," and "the" include plural referents unless the context clearly dictates otherwise. Ranges may be expressed herein as from "about" or "approximately" one particular value, and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. "Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers, or steps. The terms "consisting essentially of" and "consisting of" may be used in place of "comprising" and "including" to provide for more specific embodiments of the invention and are also disclosed. "Exemplary" or "for example" means "an example of" and is not intended to convey an indication of a preferred or ideal embodiment. Similarly, "such as" is not used in a restrictive sense, but for explanatory or exemplary purposes.

Other than where noted, all numbers expressing geometries, dimensions, and so forth used in the specification and claims are to be understood at the very least, and not as an attempt to limit the application of the doctrine of equivalents to the scope of the claims, to be construed in light of the number of significant digits and ordinary rounding approaches.

Unless defined otherwise, all technical and scientific terms used herein have the same meanings as commonly understood by one of skill in the art to which the disclosed invention belongs. Publications cited herein and the materials for which they are cited are specifically incorporated by reference.

The present invention may be embodied in other forms without departing from the spirit and the essential attributes thereof, and, accordingly, reference should be made to the appended claims, rather than to the foregoing specification, as indicating the scope of the invention.

Additionally, the invention illustratively disclosed herein suitably may be practiced in the absence of any element which is not specifically disclosed herein.

What is claimed is:

1. A battery separator comprising a porous polymer separator layer, and a composite layer laminated onto the porous polymer separator layer, the composite layer-comprises silica and fibers, wherein the fibers are multiple strands twisted together to form a bunch and bonded with a binder, and further comprising a coating of a non-ionic surfactant on at least one surface of the composite layer.

2. The battery separator of claim 1, wherein the battery separator comprises embossed ribs or other embossments.

3. The battery separator of claim 1, wherein the fibers comprise glass fibers, synthetic fibers, ceramic fibers, or combinations thereof.

4. The battery separator of claim 3, wherein the fibers comprise glass fibers.

5. The battery separator of claim 3, wherein the fibers comprise glass fibers and synthetic fibers.

6. The battery separator of claim 1, further comprising silica.

7. The battery separator of claim 6, wherein the silica is flocculated silica.

8. The battery separator of claim 1, wherein the binder is a resin binder or a polymeric binder.

9. An AGM Battery comprising the battery separator of claim 1.

10. An AGM Battery comprising the battery separator of claim 4.

11. An AGM Battery comprising the battery separator of claim 5.

12. A VRLA-AGM battery comprising the battery separator of claim 1.

13. A VRLA-AGM battery comprising the battery separator of claim 4.

14. A VRLA-AGM battery comprising the battery separator of claim 5.

15. A flooded battery comprising the battery separator of claim 1.

16. An enhanced flooded battery comprising the battery separator of claim 1.

17. A battery comprising the battery separator of claim 1, wherein the battery separator does one or more of the following: enhance battery life, reduce internal resistance, reduce metalloid poisoning, reduce acid stratification, and improve uniformity.

18. The battery separator of claim 1, wherein the fibers are selected from the group consisting of a mixture of glass fibers and polyethylene fibers and a mixture of glass fibers and polyethylene terephthalate fibers.

19. A battery separator comprising a porous polymer separator layer and a composite layer laminated onto the porous polymer separator layer, the composite layer-comprises silica and fibers, wherein the battery separator comprises embossed ribs or other embossments and a mesh with openings impregnated with a mixture of binder and filler, and further comprising a coating of a non-ionic surfactant on at least one surface of the composite layer.

20. The battery separator of claim 19, wherein the mesh has a starting basis weight of about 60 g/m$^2$ and a high density of greater than 130 g/m$^2$, and the filler comprises flocculated silica.

* * * * *